E. Heald,
Cut-Off for Cisterns.
No. 57,321. Patented Aug. 21, 1866.
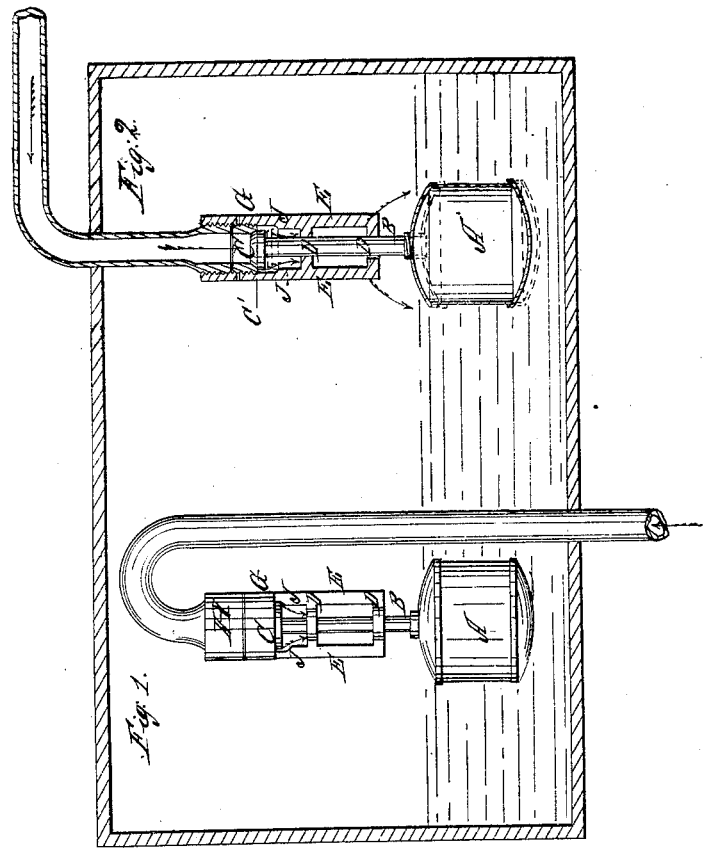
Witnesses:
M. Crofield
Levy Ollenberg
Inventor:
Edwin Heald

UNITED STATES PATENT OFFICE.

EDWIN HEALD, OF WASHINGTON, DISTRICT OF COLUMBIA.

IMPROVEMENT IN FLOAT-VALVES FOR CISTERNS.

Specification forming part of Letters Patent No. 57,321, dated August 21, 1866.

*To all whom it may concern:*

Be it known that I, EDWIN HEALD, of the city of Washington, District of Columbia, have invented an Improved Float and Valve Combined for Regulating the Flow of Water in Cisterns; and I do hereby declare the following to be an exact description thereof, reference being had to the accompanying drawings, and to the letters of reference marked thereon, making a part of this specification.

Figure 1 represents the float and valve combined, and showing how it may be attached to a water-pipe and operated in a cistern of water. Fig. 2 shows a sectional view.

The nature of my invention consists in a circular or globular float, with a piston, guides, valve, and double-screw collar or cylinder, so as to be connected with a water-pipe for the purpose of regulating the flow of water in cisterns.

A represents the float, that may be made of any material and any shape. It is attached to a rod or piston, B, with a round button or valve, C, at the upper end of the piston B. The piston operates in two circular guides, D D, between two stays, E E, that are connected with the cylinder G.

A top cylinder, H, has a screw-thread on the inside, at top, to be connected with a water-pipe, and a screw on the lower end to screw and fit into the cylinder G. The lower end of the cylinder H is countersunk or beveled on the inside for the rounding top $c$ to fit into and close the cylinder H as a valve when the water in the cistern presses the float A upward, and thus shuts off the flow of water. When the water discharges from the cistern the float lowers with it, and the valve C falls down upon the offsets J J, and the water again flows through the cylinders H and G, and into the cistern, refilling the cistern with the quantity of water required and regulating the quantity.

What I claim as my invention, and desire to secure by Letters Patent, is—

The construction and combination of the float A, piston B, guides D D, valve C, and double screw-cylinder H, forming the valve-seat $c'$, all as herein described, and for the purposes set forth.

EDWIN HEALD.

Witnesses:
   J. FRANKLIN REIGART,
   EDM. F. BROWN.